Figure 1:
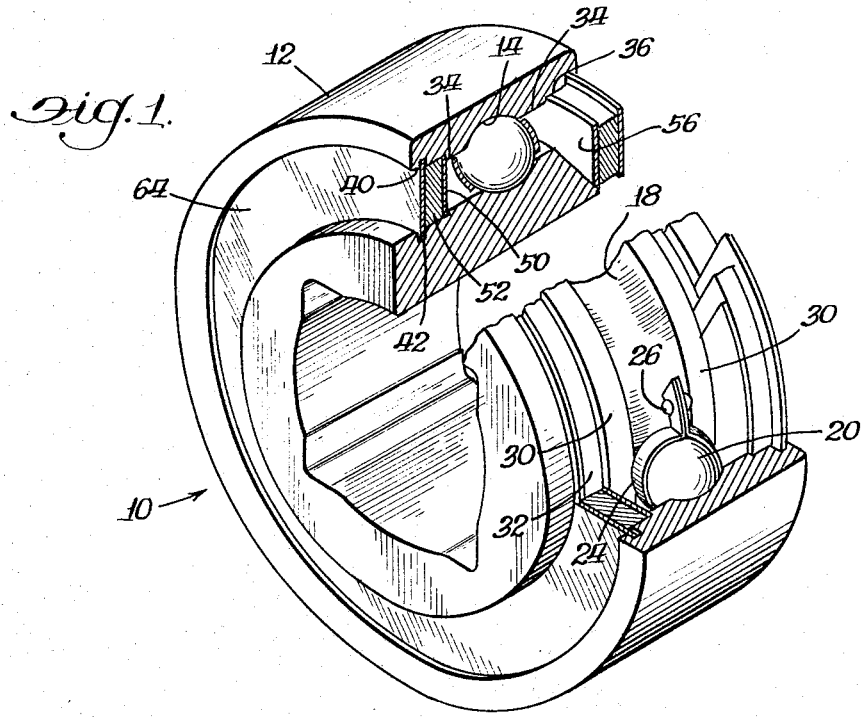

July 11, 1967  D. A. DELP  3,330,607

MECHANICAL DEVICE

Filed July 23, 1965

Inventor:
Donald A. Delp

By: Mueller, Aichele & Rauner
Attys.

United States Patent Office 3,330,607
Patented July 11, 1967

3,330,607
MECHANICAL DEVICE
Donald A. Delp, Valparaiso, Ind., assignor to McGill Manufacturing Company, Inc., Valparaiso, Ind., a corporation of Indiana
Filed July 23, 1965, Ser. No. 474,313
3 Claims. (Cl. 308—187.2)

This invention relates generally to bearing assemblies, and more particularly to anti-friction bearing assemblies having an improved sealing structure which provides an effective seal for keeping foreign matter out of the bearing raceway.

In heavily contaminated applications for ball bearings such as are found in the farm implement industry, and in particular, bearings used in disc harrows, there is a need for an efficient bearing seal, because the disc harrow blade operates underground for much of its useful life, and is therefore subject to extreme contamination. Generally, bearing failures in the harrow blades are due to contamination of lubricant precipitated by seal failure, and the wearing out of the bearing due to such contamination.

One type of seal which has been customarily used for this type of application is the rubber lip-type seal which is comprised of metal cups and alternating metal spacers and rubber or leather sealing members. Because the sealing members cause a significant "drag" on the moving bearing parts, it is essential to grind the mating inner and outer races to a close tolerance and a better finish to minimize the contact of the sealing members with the inner race thereby reducing the "drag." The ground metal surface which the sealing member contacts corrodes when it is exposed to the atmosphere, thereby greatly reducing the seal effectiveness. In addition, there is generally a clearance between one of the races and the cup which supports the sealing members. This clearance permits trash windings such as grass and weeds to wrap themselves around the rotating seal members. Because the trash windings are essentially abrasive in nature, they cut out the seal member and cause seal failure. One means of meeting the trash winding problem has been to increase the number of sealing members, but such attempts have not been completely successful and add increased cost to the bearing.

It is one object of this invention to provide an anti-friction bearing assembly having an improved lubricant seal to provide longer bearing life in machinery which is operated in dirt, water, and contaminants generally.

It is another object of this invention to provide an anti-friction bearing assembly having a sealing member that eliminates corrosion of the bearing race surfaces in contact with the sealing member, and reduces bearing failures resulting from inadequate sealing at such surfaces.

It is another object of this invention to provide a sealing member for an anti-friction bearing assembly that is not subject to being cut out by abrasive trash winding action when the equipment in which the bearing is mounted is operated in abrasive trash.

Still another object of this invention is to provide a seal for an anti-friction bearing member that is relatively simple and inexpensive to manufacture.

One feature of this invention is the provision of a seal for closing an annular space between two relatively rotatable members, each having an annular shoulder and an annular groove therein spaced axially apart and defining an annular portion therebetween, having a ring shaped compressible member mounted in the annular portion and interference fit to each of the rotatable members. The compressible member is compressed between two sealing rings one of which is mounted against the annular shoulders, and the other of which is retained and supported by the annular grooves in the corresponding rotatable members.

Another feature of this invention is an anti-friction bearing, with an inner race ring and an outer race ring spaced radially apart and providing a raceway therebetween for receiving a plurality of anti-friction elements therein and with an annular bore axially of the raceway and a counter bore adjacent the bore, having a first annular sealing ring mounted against a shoulder portion formed between the bore and the counter bore, an annular compressible felt member mounted adjacent the first ring in the counter bore and in an interference fit with the inner and outer race rings and a second annular sealing ring retained and supported in the corresponding grooves in the opposing surfaces of the inner and outer race rings. The second sealing ring in being retained by the grooves compresses the compressible felt member in an axial direction against the first sealing ring to form a seal in at least one axial end portion of the bearing.

Figure 2:
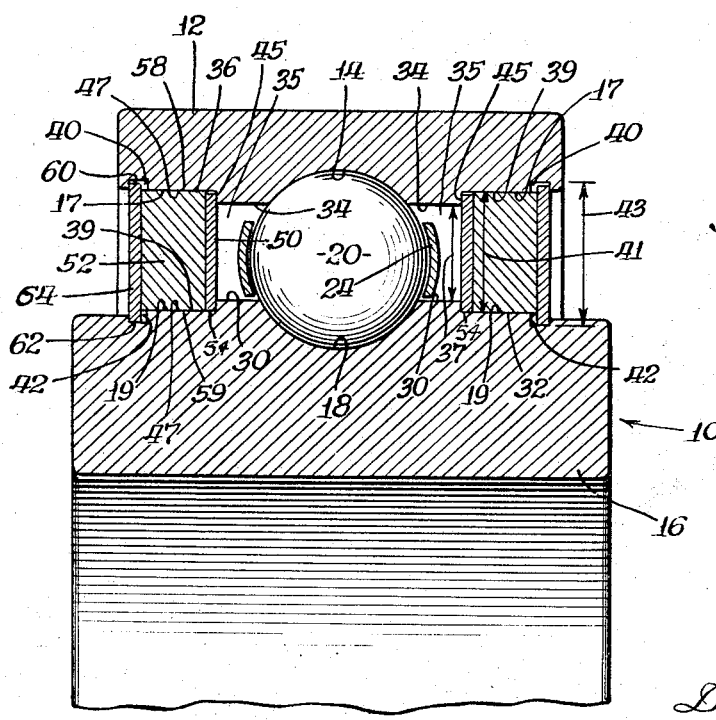

The invention is illustrated in the accompanying drawings in which:

FIG. 1 is a perspective view, partly in section, showing a ball bearing assembly and seal structure in accordance with this invention; and FIG. 2 is a fragmentary cross-sectional view of the bearing assembly of FIG. 1.

In accordance with one embodiment of this invention, the anti-friction ball bearing assembly includes an inner race ring and an outer race ring spaced radially apart to provide a raceway therebetween for receiving a series of rolling elements. The combination forms an annular bore axially of the raceway in at least one end thereof with a predetermined radial dimension for a part of the bore adjacent the raceway. An annular counter bore adjacent the bore provides a seal mounting area which includes a stepped configuration on corresponding portions of the opposing surfaces of the two race rings. Each race ring has an annular grooved portion adjacent the outside axial extremity of the counter bore. Intermediate the annular groove portion and the predetermined radial dimension part of the bore on each race ring is an annular surface of a greater radial dimension than the bore, which forms a right angle shoulder portion between the bore and the annular portion of the counter bore. The seal consists of a first annular sealing ring mounted against the shoulder portions and having a radial dimension substantially the same as the radial dimension of the annular counter bore. A compressible fibrous member is mounted at the annular portion of the counter bore adjacent the first sealing ring. The fibrous member is compressed by the inner and outer race rings to form an interference fit therewith and has an axial dimension greater than the axial dimension of the intermediate portion. Therefore, when a second annular sealing ring, which has a radial dimension substantially the same as the radial dimension between the bottom of the grooves is mounted in the groove portions, it presses the fibrous member axially inwardly against the first sealing ring to maintain the fibrous member under compression. An equal and opposite reaction of the fibrous member forces the second annular ring against the outward wall of each groove to form a running contact seal therewith.

Referring specifically to the drawings, the bearing assembly of FIGS. 1 and 2 is of the ball bearing type, but this invention is not limited to this particular type of bearing and would find equal utility, for instance, with radial roller or spherical roller bearing assemblies.

The bearing assembly 10 includes an outer race ring 12 which has a ball track 14, and an inner race ring 16 which has a ball track 18. The race rings 12 and 16 have a common axis and form a raceway in the bearing tracks 14 and 18 between the respective outer and inner faces thereof. A series of rolling elements 20 are positioned in the raceway by separator 24 which is joined together by rivet 26. The separator rides on and is supported by the lands 30 on the inner race ring 16. The inner diameter of the outer race ring is mated to the outer diameter of the inner race ring and has similar lands portions 34. The lands 30 and 34 form an annular bore 35 axially of the raceways 14 and 18. The bore has a predetermined radial dimension 37. An annular counterbore 39 is adjacent the bore 35. The counterbore 39 is formed by annular portions 47 on the opposing inner and outer surfaces 17 and 19 respectively of the outer 12 and inner 16 race rings. The radial dimension of the counterbore 39 is greater than the predetermined radial dimension 37 of the bore but is less than the predetermined radial dimension 43 between the bottoms of the grooves 40 and 42. The difference in the radial dimensions of the bore 35 and counterbore 39 provide right angle shoulder portions 45 adjacent the annular portions 47 which form the counterbore. A pair of grooves 40 adjacent the outside axial extremity of the counterbore 39 extend radially into the inner surface 17 of the outer race ring 12, while an oppositely disposed pair of grooves 42 extend radially into the outer surface 19 of inner race ring 16. The grooves 40 and 42 are oppositely disposed from one another and located near the outer axial end portions of the respective race rings. The annular spaces between the inner and outer race rings at each of their axial end portions are provided with sealing structures in the manner hereinafter described.

The seal of this invention is of the multiple element type. The first element is an annular sealing ring 50 made from a suitably rigid but slightly resilient material, preferably punched or molded from a plastic or a synthetic material such as nylon to form a flexible sealing element. When the preferred nylon and plastic materials are used, it is known that they are pressure sensitive and tend to cold flow after substantial continued use so that they will conform themselves to the available confining space. This means that if the nylon seal is mounted with no external support, it will not maintain a tight or press fit with an associated seal bearing member. Therefore, after a short period of time in an operating installaiton, if a nylon sealing member were interference fitted either in the bore or outer diameter of the bearing assembly, the fit would become loose allowing the entrance of foreign material into the bearing raceway. Moreover, nylon exhibits a tendency to pick up moisture which makes the diameter of the seal grow or shrink, if it were to be baked, as much as 7 to 10 percent. If unsupported, the seal will be deformed by this expansion or contraction thereby allowing the entrance of foreign material into the bearing raceway. Many of the plastic materials, and particularly nylon, however, are known to have self-lubricating properties so that running contact fits with steel surfaces may be maintained without greatly increasing seal "drag."

The second element of the seal of the present invention is an annular sealing ring 52 made from a compressible material such as felt. The third element of the seal is an annular sealing ring 54 stamped or molded from substantially the same material as the element 50.

In operation, the inner annular surface 54 of the sealing element 50 is supported by the annular portion 47 on the inner race ring 16, and its radial face 56 (FIG. 1) is mounted against the shoulder portions 45 of the inner and outer race rings respectively. The felt sealing element 52 has a radial face (not shown), defined by its outer peripheral surface 58 and inner annular surface 59, that has a radial cross-section slightly greater than the radial dimension 41 between the mated annular portions 47 of the inner and outer race rings. When in place, the felt element 52 is supported by the annular portion 47 on the inner race ring 16 with its radial face mounted against the first seal element 50 and is radially compressed by the annular portions 47 on the corresponding race rings into an interference fit therewith. The third element or sealing ring 54 has an outer peripheral surface 60 and an inner annular surface 62 that defines its radial face 64 (FIG. 1). The ring 54 is positioned within the corresponding grooves 40 and 42, with the inner annular surface 62 pressed for a close running fit into the groove 42 in the inner race ring 16 to maintain the element 54 in position and to resist the ring's axial displacement by foreign material. The outer peripheral surface 60 is maintained in a close-running fit with the groove 40. The axial cross-section of the felt member 52 is chosen so that it is greater than the axial dimension of the annular portion 47 and extends beyond the grooves 40 and 42. Therefore, when the ring 54 is snapped into place, the felt member is compressed inwardly in the axial direction. The opposite reaction of the felt member presses the outside radial face 64 of the element 54 into a running contact fit with the outside face of each of the grooves 40 and 42, and the inside radial face 56 into a running contact fit with the shoulder portions 45 of the inner and outer race rings on each side of the ball raceway as shown in FIG. 2.

The sealing action of the multiple element seal is achieved by the inside and outside radial faces 64 and 56 of the sealing rings 54 and 50 pressing against the outside walls of the grooves 40 and 42 and against the shoulder portions 45, and by the felt element 52 being interference fit in the counter bore 39. The felt member 52 is soaked in a lubricant and the sealing rings 50 and 54 are self-lubricating so that the "drag" on the bearing is a relatively small amount.

Because the third element 54 makes a contact seal with the inner and outer races the atmosphere is effectively blocked from the sealed portion of the bearing thereby eliminating corrosion of the bearing races. In addition, the member 54 is immune to trash winding action, because the contact seal of that member insures that grass or weeds cannot penetrate to and attack the felt element of the seal.

The seal has been described for one axial end of the bearing structure 10, but it should be clear that this same seal is used to seal the opposite axial end. For such two-seal assembly as shown in each drawing, the same reference characters apply to like parts. In addition, this seal would find utility in those bearings where only one axial end of the bearing structure is sealed.

An actual physical embodiment of this invention which operated very satisfactorily included the following dimensions, and these are listed herein merely by way of an illustrative example, which, of course, is not intended to limit the invention in any manner.

Annular bore 35:
    Radial dimension 37 _____inch__ .318
    Outer diameter _____ inches in diameter__ 3.392
    Inner diameter _____do____ 2.756

Annular counterbore 39:
    Radial dimension 41 _____inch__ .442
    Outer diameter _____inches in diameter__ 3.529
    Inner diameter _____do____ 2.645
    Axial dimension annular portions 47 __inch__ .146

Groove 40:
    Outer diameter at
      bottom of groove _____inches__ 3.649
    Axial dimension (width) _____do____ .070

Groove 42:
    Inner diameter at bottom of
      groove _____inches in diameter__ 2.585
    Axial dimension _____inch__ .070
    Radial dimension 43 _____do____ .532

Sealing ring 50:
    Outer diameter _____inches in diameter__ 3.526
    Bore _____do____ 2.675
    Axial dimension _____inch__ .030

Sealing element 52:
    Outer diameter _____ inches in diameter__ 3.605
    Bore _____do____ 2.635
    Axial dimension _____inch__ .188

Sealing ring 54:
 Outer diameter _____inches in diameter__ 3.646
 Bore _____do____ 2.609
 Axial dimension _____inch__ .030

What has been described, therefore, is a relatively simple and inexpensive multiple element seal which combines the contact of the sealing member 54 with the known effectiveness of a compressed inner seal 52 plus a third foreign material barrier of the first ring 50. The complete seal eliminates corrosion of the bearing races and seal failures due to abrasive trash winding action.

I claim:

1. In an anti-friction bearing having an inner race ring and an outer race ring spaced radially apart providing a raceway therebetween with anti-friction elements therein and having an annular bore axially of the raceway in at least one end thereof with a predetermined radial dimension for a part therein immediately adjacent the raceway, and an annular counterbore adjacent the bore, the combination in said counterbore of an annular seal mounting area having corresponding portions on the opposing surfaces of the two race rings, said portions on each ring being oppositely disposed in the counterbore and each comprising adjacent the outside axial extremity of the counterbore an annular grooved portion in each race ring, said groove portions being oppositely disposed with a predetermined radial dimension between the bottom of each grooved portion, an intermediate annular portion on each ring axially inwardly of the grooved portion and of lesser radial dimension between the two than that between the grooves, said lesser radial dimension being greater than said predetermined radial dimension for a part in the bore and providing a right angled shoulder portion between said intermediate annular portion and said predetermined radial dimension part, and said combination including sealing means in said counterbore comprising a first annular member mounted against said shoulder portions having a radial dimension substantially the same as said lesser radial dimension, a fibrous member mounted at the annular intermediate portion in a running fit with the surface of each said intermediate portions and of an axial dimension originally greater than the axial dimension of the intermediate portion, and a second member mounted in the groove portions having a radial dimension substantially the same as the radial dimension between the bottoms of the two groove portions, said second member being retained in said two annular groove portions and pressing the fibrous member axially inwardly substantially equal over the entire annular extent thereof to maintain the same under compression axially and in an interference fit at the annular edge thereof with said intermediate portions of the counterbore.

2. In an anti-friction bearing having an inner race ring and an outer race ring spaced radially apart providing a raceway therebetween with anti-friction elements therein and having an annular bore axially of the raceway in at least one end thereof with a predetermined radial dimension for a part therein immediately adjacent the raceway and an annular counterbore adjacent the bore, the combination in said counterbore of an annular seal mounting area having corresponding portions on each opposing surface of the two race rings, said portions on each ring being oppositely disposed in the counterbore and each comprising an annular intermediate portion with a first radial dimension greater than said predetermined radial dimension to provide a right angled shoulder portion between said annular intermediate portion and said predetermined radial dimension part, a groove portion on each ring axially displaced from said shoulder portion on that ring and defining tht outer axial limit of the annular intermediate portion, with the radial dimension between the bottom of each of the two groove portions being greater than the two radial dimensions above identified, and said combination including sealing means in said annular seal mounting area which comprises a first member extending radially across the counterbore and mounted against said shoulder portions and having a radial dimension substantially the same as said first radial dimension, a fibrous member mounted at the annular intermediate portions of the counterbore in a running fit with the surfaces of said intermediate portions, and of an axial dimension originally greater than the axial dimension between the intermediate portions, and a second member mounted at its circumference in the groove portions having a radial dimension substantially the same as the radial dimension between the bottoms of said two groove portions, with said second member being retained in and between said two annular groove portions and applying pressure in an axial direction against the fibrous member substantially equally over the entire annular extent of said fibrous member to maintain the latter under compression and in an interference fit at the annular edge thereof with said intermediate portions of the counterbore.

3. A seal closing against the introduction of foreign material therein the axial end of an annular space between two relatively rotatable members, each of said members having an annular shoulder and an annular groove therein spaced axially from one another and defining an annular surface therebetween, said seal comprising a single ring shaped compressible felt member, a first ring shaped seal ring with a predetermined radial dimension therefor corresponding substantially to the space between the two members at said annular surface and positioned against said annular shoulders, a second annular seal ring of a larger radial dimension than the first ring mounted in the groove of each said relatively rotatable members, with the axial width of each said grooves being greater than the axial dimension of the second seal ring, said seal mounted between said relatively rotatable members with an interference fit between the rotatable members and with the second annular seal ring pressed against the felt member and the latter pressed axially against the first seal ring, said second seal ring being mounted in the corresponding grooves to maintain the felt ring under compression.

References Cited
UNITED STATES PATENTS

| | | | |
|---|---|---|---|
| 1,722,488 | 7/1929 | Bott et al. | 308—187.2 |
| 2,189,838 | 2/1940 | Shafer | 308—187.2 |
| 2,591,129 | 4/1952 | Brouwer | 184—1 |
| 2,991,133 | 7/1961 | Gregg | 308—187.2 |

MARTIN P. SCHWADRON, *Primary Examiner.*

FRANK SUSKO, *Examiner.*